United States Patent
Tang et al.

(10) Patent No.: US 12,282,843 B2
(45) Date of Patent: Apr. 22, 2025

(54) IMAGE PROCESSING CONTROLLER, IMAGE PROCESSING METHOD AND DISPLAY DEVICE

(71) Applicant: BOE Technology Group Co., Ltd., Beijing (CN)

(72) Inventors: Dawei Tang, Beijing (CN); Jijing Huang, Beijing (CN); Xiaohui Ma, Beijing (CN); Zhiming Yang, Beijing (CN); Zhiliang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 968 days.

(21) Appl. No.: 17/342,836

(22) Filed: Jun. 9, 2021

(65) Prior Publication Data

US 2022/0207333 A1    Jun. 30, 2022

(30) Foreign Application Priority Data

Dec. 25, 2020 (CN) .......................... 202011565301.0

(51) Int. Cl.
| | |
|---|---|
| *G06N 3/06* | (2006.01) |
| *G06F 18/22* | (2023.01) |
| *G06N 3/045* | (2023.01) |
| *G06N 3/063* | (2023.01) |
| *G06V 10/44* | (2022.01) |
| *G06V 10/94* | (2022.01) |

(52) U.S. Cl.
CPC .............. *G06N 3/063* (2013.01); *G06F 18/22* (2023.01); *G06N 3/045* (2023.01); *G06V 10/454* (2022.01); *G06V 10/955* (2022.01)

(58) Field of Classification Search
CPC .......... G06N 3/063; G06N 3/045; G06N 3/04; G06N 3/08; G06F 18/22; G06V 10/454; G06V 10/955
See application file for complete search history.

(56) References Cited

U.S. PATENT DOCUMENTS

2020/0234133 A1*    7/2020   Li ............................ G06N 3/04
2021/0366095 A1*   11/2021   Krishnamoorthy ..... G06F 17/18

FOREIGN PATENT DOCUMENTS

| CN | 105760933 A | | 7/2016 |
|---|---|---|---|
| CN | 109032781 | * | 7/2018 |
| CN | 108647779 A | | 10/2018 |
| CN | 111626402 A | | 9/2020 |

OTHER PUBLICATIONS

Machine translation for CN 109032781 (Year: 2018).*

(Continued)

*Primary Examiner* — Qian Yang
(74) *Attorney, Agent, or Firm* — IPro, PLLC

(57) ABSTRACT

An image processing controller for a display device includes a fixed-point circuitry and a plurality of neural network blocks cascaded sequentially. The fixed-point circuitry is electrically connected to each neural network block, and configured to receive a feature signal corresponding to an output feature map about the display device from each neural network block, perform fixed-point processing on the feature signal to acquire fixed-point data within a design accuracy range, and input the fixed-point data as an input feature map to a next-level neural network block.

14 Claims, 6 Drawing Sheets

(56) References Cited

OTHER PUBLICATIONS

Park, Jinhwan, and Wonyong Sung. "FPGA based implementation of deep neural networks using on-chip memory only." 2016 IEEE International conference on acoustics, speech and signal processing (ICASSP). IEEE, 2016.
CN 202011565301.0 first office action dated Nov. 27, 2024.

\* cited by examiner

IMAGE PROCESSING CONTROLLER, IMAGE PROCESSING METHOD AND DISPLAY DEVICE

CROSS-REFERENCE TO RELATED APPLICATION

This application claims a priority of the Chinese patent application No. 202011565301.0 filed on Dec. 25, 2020, which is incorporated herein by reference in its entirety.

TECHNICAL FIELD

The present disclosure relates to the field of image processing technology, in particular to an image processing controller, an image processing method and a display device.

BACKGROUND

Currently, before the hardware deployment and algorithm deployment of a Convolutional Neural Network (CNN) algorithm, it is necessary for a server to perform model constructing, parameter training and parameter optimization on the algorithm. Data calculated in the CNN algorithm at a server end is of a floating-point type. Then, weight parameters and input feature maps acquired after the training are subjected to hardware processing. An Field Programmable Gate Array (FPGA) is selected as a chip for the hardware deployment, and the FPGA is adapted to parallel computation on a large volume of data. During the hardware deployment, it is necessary to convert a floating-point data type to a fixed-point data type, so as to meet the real-time working requirement on hardware.

In the case of fixed-point processing, a conventional method includes steps of calculating a maximum value and a minimum value of each layer of a CNN (mainly including a plurality of convolutional layers and pooling layers), and then performing the fixed-point processing uniformly. An overflow problem easily occurs for the fixed-point processing in this method, so the calculation accuracy deteriorates.

SUMMARY

In one aspect, the present disclosure provides in some embodiments an image processing controller for a display device, including a fixed-point circuitry and a plurality of neural network blocks cascaded sequentially. The fixed-point circuitry is electrically connected to each neural network block, and configured to receive a feature signal corresponding to an output feature map about the display device from each neural network block, perform fixed-point processing on the feature signal to acquire fixed-point data within a design accuracy range, and input the fixed-point data as an input feature map to a next-level neural network block.

In some possible embodiments of the present disclosure, a first input end and a second input end of the fixed-point circuitry are configured to receive a convolutional layer indication signal and the feature signal respectively. The fixed-point circuitry is configured to determine a corresponding neural network block in accordance with the convolutional layer indication signal, determine a design fixed-point range of the corresponding neural network block in accordance with a design fixed-point range of each neural network block, and perform the fixed-point processing on the feature signal in accordance with the design fixed-point range of the corresponding neural network block, so as to acquire the fixed-point data within the design accuracy range.

In some possible embodiments of the present disclosure, the fixed-point circuitry includes a first triggering sub-circuitry and a first gating sub-circuitry. A first input end of the first triggering sub-circuitry serves as the first input end of the fixed-point circuitry, a second input end of the first triggering sub-circuitry is configured to receive a first clock signal, a first input end of the first gating sub-circuitry is electrically connected to an output end of the first triggering sub-circuitry, a second input end of the first gating sub-circuitry serves as the second input end of the fixed-point circuitry, and a third input end of the first gating sub-circuitry is grounded. The first gating sub-circuitry is configured to determine the corresponding neural network block in accordance with the received convolutional layer indication signal, determine the design fixed-point range of the corresponding neural network block in accordance with a pre-stored design fixed-point range of each neural network block, and perform the fixed-point processing on the feature signal in accordance with the design fixed-point range of the corresponding the neural network block, so as to acquire the fixed-point data within the design accuracy range.

In some possible embodiments of the present disclosure, the fixed-point circuitry further includes a second triggering sub-circuitry, a first input end of which is electrically connected to an output end of the first gating sub-circuitry, a second input end of which is electrically connected to the second input end of the first triggering sub-circuitry, and an output end of which is configured to output the fixed-point data.

In some possible embodiments of the present disclosure, each neural network block includes a convolutional operation sub-circuitry, a pooling sub-circuitry and an activation sub-circuitry electrically connected in turn. The convolutional operation sub-circuitry is electrically connected to the fixed-point circuitry, and configured to receive an input feature map corresponding to the fixed-point data from the fixed-point circuitry, and perform convolutional processing on the input feature map to acquire a first to-be-processed image. The pooling sub-circuitry is configured to perform pooling processing on the first to-be-processed image to acquire a second to-be-processed image. The activation sub-circuitry is configured to perform activation processing on the second to-be-processed image to acquire the output feature map.

In some possible embodiments of the present disclosure, the pooling sub-circuitry includes a plurality of levels of comparison sub-circuitries cascaded sequentially. The quantity of secondary comparison sub-circuitries of a current-level comparison sub-circuitry is a designed multiple of the quantity of secondary comparison sub-circuitries of a next-level comparison sub-circuitry. An input end of each secondary comparison sub-circuitry of a first-level comparison sub-circuitry is configured to receive the first to-be-processed image. Apart from the first-level comparison sub-circuitry, an input end of each secondary comparison sub-circuitry of a current-level comparison sub-circuitry is electrically connected to an output end of a secondary comparison sub-circuitry of a previous-level comparison sub-circuitry. The plurality of levels of comparison sub-circuitries is configured to compare feature matrices in the received first to-be-processed image sequentially, and select a maximum value to acquire the second to-be-processed image. An output end of a last-level comparison sub-circuitry is electrically connected to an input end of the activation sub-circuitry.

In some possible embodiments of the present disclosure, each secondary comparison sub-circuitry includes a comparator, a second gating unit and a third trigger. An input end of the comparator and a first input end of the second gating unit together serve as an input end of the secondary comparison sub-circuitry, a second input end of the second gating unit is electrically connected to an output end of the comparator and configured to receive a comparison result from the comparator, an output end of the second gating unit is electrically connected to a first input end of a corresponding third trigger, a second input end of the third trigger is configured to receive a second clock signal, and an output end of the third trigger serves as an output end of the secondary comparison sub-circuitry.

In some possible embodiments of the present disclosure, the activation sub-circuitry includes a fourth trigger. A first input end and a resetting end of the fourth trigger are electrically connected to an output end of the last-level comparison sub-circuitry, and configured to perform activation processing on each numerical values of the second to-be-processed image to acquire the output feature map. A second input end of the fourth trigger is configured to receive the second clock signal, and an output end of the fourth trigger is configured to output the output feature map.

In another aspect, the present disclosure provides in some embodiments an image processing method for a display device, including: receiving a convolutional layer indication signal; determining a corresponding neural network block in accordance with the convolutional layer indication signal, and determining a design fixed-point range of the corresponding neural network block in accordance with a pre-stored design fixed-point range of each neural network block; and performing fixed-point processing on a feature signal corresponding to an output feature map about the display device from the corresponding neural network block in accordance with the design fixed-point range of the corresponding neural network block, so as to acquire fixed-point data within a design accuracy range.

In some possible embodiments of the present disclosure, the performing fixed-point processing on the feature signal corresponding to the output feature map about the display device from the corresponding neural network block in accordance with the design fixed-point range of the corresponding neural network block so as to acquire the fixed-point data within the design accuracy range includes: determining whether a difference between a design fixed-point range of a current-level neural network block and a design fixed-point range of a previous-level neural network block is greater than a predetermined threshold; and when the difference is not greater than the predetermined threshold, taking the design fixed-point range of the previous-level neural network block as the design fixed-point range of the current-level neural network block.

In yet another aspect, the present disclosure provides in some embodiments a non-transitory computer-readable storage medium storing therein a computer instruction. The computer instruction is executed by a computer to implement the above-mentioned image processing method.

In still yet another aspect, the present disclosure provides in some embodiments a display device including an image processing controller. The image processing controller includes a fixed-point circuitry and a plurality of neural network blocks cascaded sequentially. The fixed-point circuitry is electrically connected to each neural network block, and configured to receive a feature signal corresponding to an output feature map about the display device from each neural network block, perform fixed-point processing on the feature signal to acquire fixed-point data within a design accuracy range, and input the fixed-point data as an input feature map to a next-level neural network block.

In some possible embodiments of the present disclosure, a first input end and a second input end of the fixed-point circuitry are configured to receive a convolutional layer indication signal and the feature signal respectively. The fixed-point circuitry is configured to determine a corresponding neural network block in accordance with the convolutional layer indication signal, determine a design fixed-point range of the corresponding neural network block in accordance with a design fixed-point range of each neural network block, and perform the fixed-point processing on the feature signal in accordance with the design fixed-point range of the corresponding neural network block, so as to acquire the fixed-point data within the design accuracy range.

In some possible embodiments of the present disclosure, the fixed-point circuitry includes a first triggering sub-circuitry and a first gating sub-circuitry. A first input end of the first triggering sub-circuitry serves as the first input end of the fixed-point circuitry, a second input end of the first triggering sub-circuitry is configured to receive a first clock signal, a first input end of the first gating sub-circuitry is electrically connected to an output end of the first triggering sub-circuitry, a second input end of the first gating sub-circuitry serves as the second input end of the fixed-point circuitry, and a third input end of the first gating sub-circuitry is grounded. The first gating sub-circuitry is configured to determine the corresponding neural network block in accordance with the received convolutional layer indication signal, determine the design fixed-point range of the corresponding neural network block in accordance with a pre-stored design fixed-point range of each neural network block, and perform the fixed-point processing on the feature signal in accordance with the design fixed-point range of the corresponding the neural network block, so as to acquire the fixed-point data within the design accuracy range.

In some possible embodiments of the present disclosure, the fixed-point circuitry further includes a second triggering sub-circuitry, a first input end of which is electrically connected to an output end of the first gating sub-circuitry, a second input end of which is electrically connected to the second input end of the first triggering sub-circuitry, and an output end of which is configured to output the fixed-point data.

In some possible embodiments of the present disclosure, each neural network block includes a convolutional operation sub-circuitry, a pooling sub-circuitry and an activation sub-circuitry electrically connected in turn. The convolutional operation sub-circuitry is electrically connected to the fixed-point circuitry, and configured to receive an input feature map corresponding to the fixed-point data from the fixed-point circuitry, and perform convolutional processing on the input feature map to acquire a first to-be-processed image. The pooling sub-circuitry is configured to perform pooling processing on the first to-be-processed image to acquire a second to-be-processed image. The activation sub-circuitry is configured to perform activation processing on the second to-be-processed image to acquire the output feature map.

In some possible embodiments of the present disclosure, the pooling sub-circuitry includes a plurality of levels of comparison sub-circuitries cascaded sequentially. The quantity of secondary comparison sub-circuitries of a current-level comparison sub-circuitry is a designed multiple of the quantity of secondary comparison sub-circuitries of a next-level comparison sub-circuitry. An input end of each secondary comparison sub-circuitry of a first-level comparison sub-circuitry is configured to receive the first to-be-processed image. Apart from the first-level comparison sub-circuitry, an input end of each secondary comparison sub-circuitry of a current-level comparison sub-circuitry is electrically connected to an output end of a secondary comparison sub-circuitry of a previous-level comparison sub-circuitry. The plurality of levels of comparison sub-circuitries is configured to compare feature matrices in the received first to-be-processed image sequentially, and select a maximum value to acquire the second to-be-processed image. An output end of a last-level comparison sub-circuitry is electrically connected to an input end of the activation sub-circuitry.

In some possible embodiments of the present disclosure, each secondary comparison sub-circuitry includes a comparator, a second gating unit and a third trigger. An input end of the comparator and a first input end of the second gating unit together serve as an input end of the secondary comparison sub-circuitry, a second input end of the second gating unit is electrically connected to an output end of the comparator and configured to receive a comparison result from the comparator, an output end of the second gating unit is electrically connected to a first input end of a corresponding third trigger, a second input end of the third trigger is configured to receive a second clock signal, and an output end of the third trigger serves as an output end of the secondary comparison sub-circuitry.

In some possible embodiments of the present disclosure, the activation sub-circuitry includes a fourth trigger. A first input end and a resetting end of the fourth trigger are electrically connected to an output end of the last-level comparison sub-circuitry, and configured to perform activation processing on each numerical values of the second to-be-processed image to acquire the output feature map. A second input end of the fourth trigger is configured to receive the second clock signal, and an output end of the fourth trigger is configured to output the output feature map.

The other aspects and advantages of the present disclosure will be given or may become apparent in the following description, or may be understood through the implementation of the present disclosure.

BRIEF DESCRIPTION OF THE DRAWINGS

The above and/or the other aspects and advantages of the present disclosure will become more apparent and understandable in conjunction with the drawings and the embodiments, and in these drawings.

DETAILED DESCRIPTION

Figure 1:
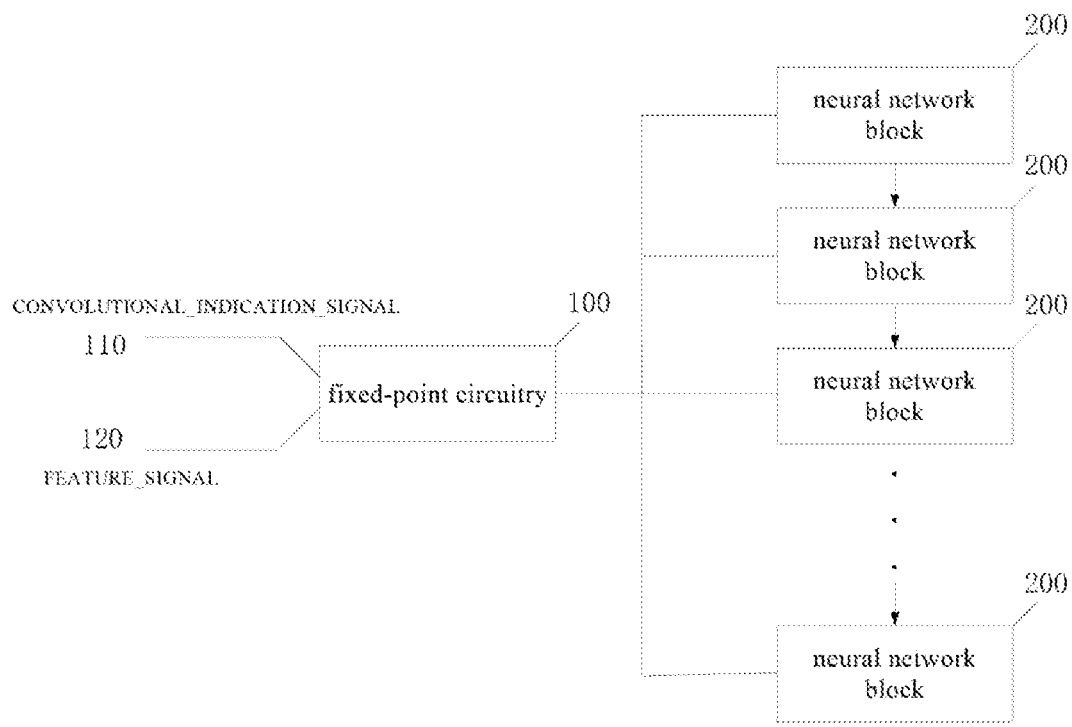
FIG. 1 is a block diagram of an image processing controller according to one embodiment of the present disclosure.

The present disclosure will be described hereinafter in conjunction with the embodiments and the drawings. Identical or similar reference numbers in the drawings represent an identical or similar element or elements having an identical or similar function. In addition, the detailed description about any known technology, which is unnecessary to the features in the embodiments of the present disclosure, will be omitted. The following embodiments are for illustrative purposes only, but shall not be used to limit the scope of the present disclosure.

Unless otherwise defined, any technical or scientific term used herein shall have the common meaning understood by a person of ordinary skills. Any term defined in a commonly-used dictionary shall be understood as having the meaning in conformity with that in the related art, shall not be interpreted idealistically and extremely.

Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. In the case that one element is connected or coupled to another element, it may be directly connected or coupled to the other element, or an intermediate element may be arranged therebetween. At this time, the element may be connected or coupled to the other element in a wireless or wired manner. In addition, the expression "and/or" is used to indicate the existence of all or any one of one or more of listed items, or combinations thereof.

It is found through researches that, in the case of fixed-point processing, a conventional method includes steps of calculating a maximum value and a minimum value of each layer of a CNN (mainly including a plurality of convolutional layers and pooling layers), and then performing the fixed-point processing uniformly. An overflow problem easily occurs for the fixed-point processing in this method, especially when a difference between the maximum values or minimum values of the layers is relatively large. When a range of a first convolutional layer is (−1000, 1000) and a range of the second convolutional layer is (−1, 1), in order to prevent the occurrence of the overflow for the range (−1000, 1000) in the uniform fixed-point processing in the conventional method, a partial loss of accuracy may occur for the convolutional layer with the range (−1, 1). Hence, there is an urgent need to provide an image processing method to prevent the occurrence of the overflow for the fixed-point process and improve the calculation accuracy.

The technical solutions and how to solve the above-mentioned technical problem through the technical solutions will be described hereinafter in conjunction with the embodiments.

The present disclosure provides in some embodiments an image processing controller for, e.g., a display device. As shown in FIG. 1, the image processing controller includes a fixed-point circuitry 100 and a plurality of neural network blocks 200 cascaded sequentially.

The fixed-point circuitry 100 is electrically connected to each neural network block 200, and configured to receive a feature signal corresponding to an output feature map about the display device from each neural network block 200, perform fixed-point processing on the feature signal to acquire fixed-point data within a design accuracy range, and input the fixed-point data as an input feature map to a next-level neural network block 200.

Considering that layers of a CNN are independent from each other, a maximum value and a minimum value of each convolutional layer may be calculated to acquire a numerical range of each convolutional layer, and then the fixed-point processing may be performed on each convolutional layer. When a difference between the maximum values or minimum values of the layers in the CNN is relatively large, it is able to effectively reduce an error caused by the fixed-point processing, thereby to improve the calculation accuracy.

For example, when a difference between maximum values or minimum values of a first convolutional layer1 and a third convolutional layer3 is relative large and a numerical range of the third convolutional layer3 is far greater than that of the first convolutional layer1, in the fixed-point processing in the conventional method, the convolutional layer3 with the larger numerical range may be taken as a standard for the fixed-point processing. At this time, the fixed-point standard is too large for the first convolutional layer1, so the accuracy may be reduced, i.e., details in a feature map may be probably unable to be distinguished, and thereby an output result may be adversely affected. According to the image processing controller in the embodiments of the present disclosure, for the convolutional layer1 and the convolutional layer3, a fixed-point processing range may be determined in accordance with the maximum value and the minimum value of each layer, and even when the difference is relatively large, it is still able to acquire the output result at a higher accuracy level than the conventional method.

Based on the above analysis, in the embodiments of the present disclosure, the fixed-point circuitry 100 may be electrically connected to each neural network block 200, and configured to perform the fixed-point processing on the output feature map from the network neural network block 200 at each layer to acquire the fixed-point data within the design accuracy range. Hence, in the embodiments of the present disclosure, the fixed-point circuitry 100 may process the output feature map from the neural network block 200 at each layer, and it may determine the fixed-point range in accordance with the maximum value and the minimum value of the output feature map from the neural network block 200 at each layer. As a result, it is able to prevent the occurrence of overflows for the fixed-point processing, and improve the calculation accuracy.

In some embodiments of the present disclosure, as shown in FIG. 1, a first input end 110 and a second input end 120 of the fixed-point circuitry 100 are configured to receive a convolutional layer indication signal CONVOLUTIONAL_INDICATION_SIGNAL and the feature signal FEATURE_SIGNAL respectively. Correspondingly, the fixed-point circuitry 100 is configured to determine a corresponding neural network block 200 in accordance with the convolutional layer indication signal, determine a design fixed-point range of the corresponding neural network block 200 in accordance with a design fixed-point range of each neural network block 200, and perform the fixed-point processing on the feature signal in accordance with the design fixed-point range of the corresponding neural network block 200, so as to acquire the fixed-point data within the design accuracy range.

In some possible embodiments of the present disclosure, the image processing controller in the embodiments of the present disclosure may be adapted to perform the fixed-point processing on the basis of heart rate detection.

In some possible embodiments of the present disclosure, the design fixed-point range of each neural network block 200 may be determined in accordance with the maximum value and the minimum value of the output feature map from the neural network block 200 at each layer.

In some possible embodiments of the present disclosure, the fixed-point processing may include multiplying data by a designed multiple in accordance with the design fixed-point range so as to prevent the data from going beyond the design accuracy range. In this way, it is able to prevent the occurrence of the overflows for the fixed-point processing, and improve the calculation accuracy.

Figure 2:
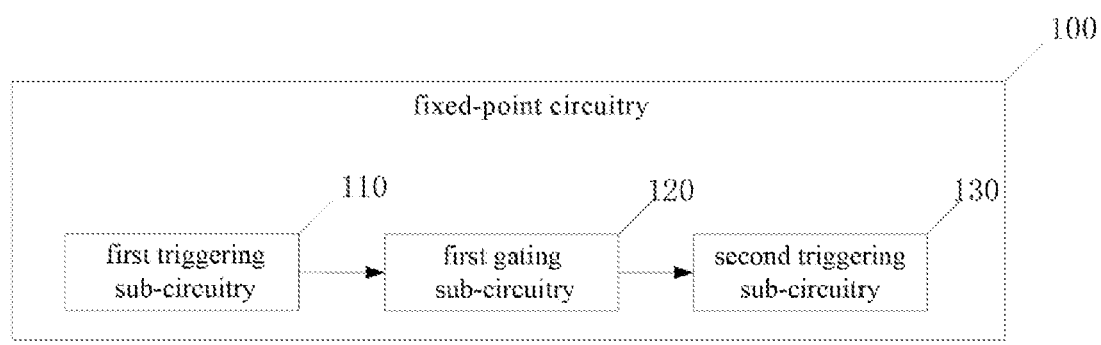
FIG. 2 is a block diagram of a fixed-point circuitry according to one embodiment of the present disclosure.
Figure 3:
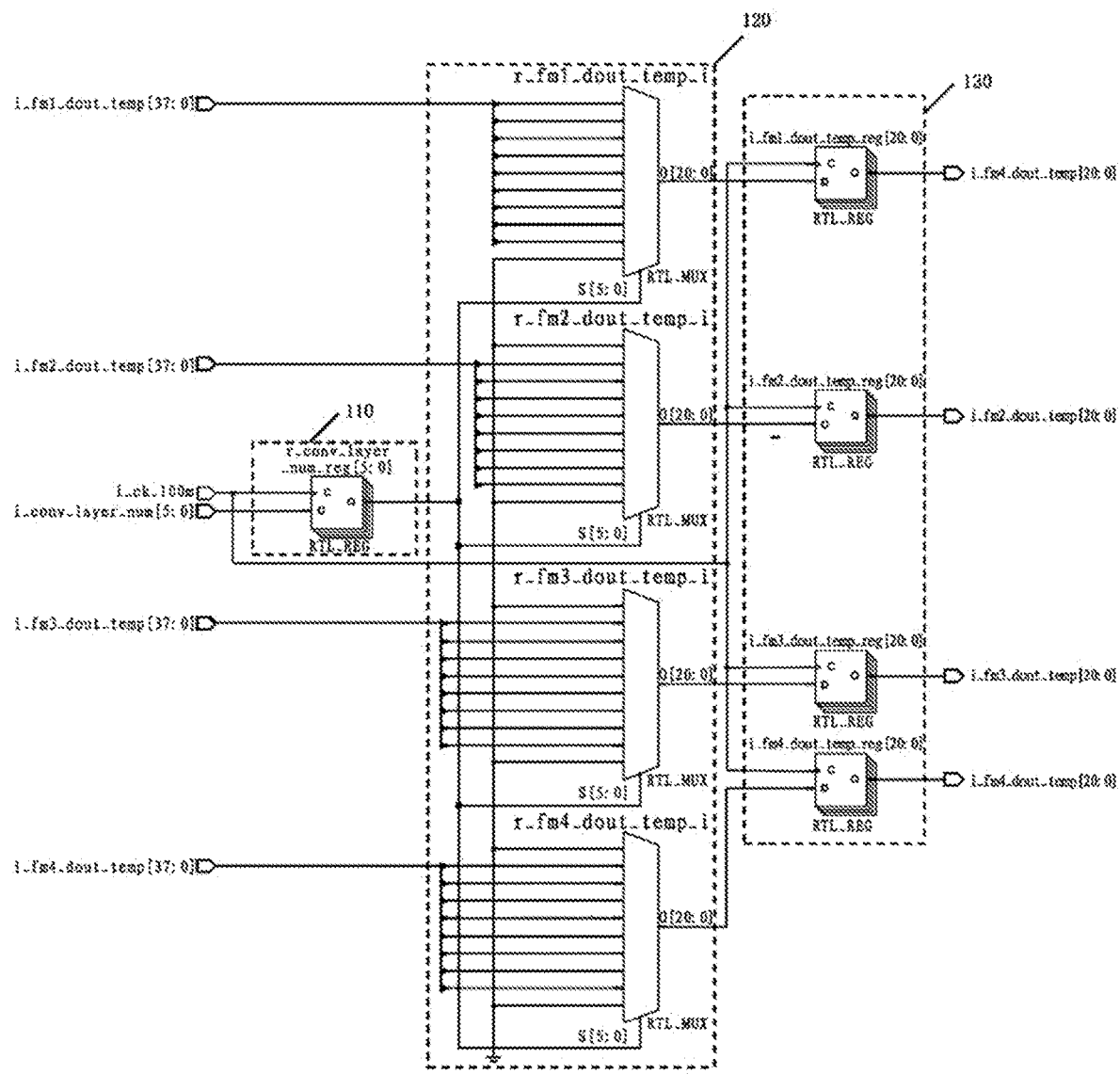
FIG. 3 is a schematic view showing the fixed-point circuitry according to one embodiment of the present disclosure.

In some embodiments of the present disclosure, as shown in FIGS. 2 and 3, the fixed-point circuitry 100 includes a first triggering sub-circuitry 110 and a first gating sub-circuitry 120.

A first input end of the first triggering sub-circuitry 110 serves as the first input end of the fixed-point circuitry 100, a second input end of the first triggering sub-circuitry 110 is configured to receive a first clock signal, a first input end of the first gating sub-circuitry 120 is electrically connected to an output end of the first triggering sub-circuitry 110, a second input end of the first gating sub-circuitry 120 serves as the second input end of the fixed-point circuitry 100, and a third input end of the first gating sub-circuitry 120 is grounded. The first gating sub-circuitry 120 is configured to determine the corresponding neural network block 200 in accordance with the received convolutional layer indication signal, determine the design fixed-point range of the corresponding neural network block in accordance with a pre-stored design fixed-point range of each neural network block 200, and perform the fixed-point processing on the feature signal in accordance with the design fixed-point range of the corresponding the neural network block 200, so as to acquire the fixed-point data within the design accuracy range.

In some possible embodiments of the present disclosure, as shown in FIGS. 2 and 3, the first triggering sub-circuitry 110 includes at least one first trigger, and the first gating sub-circuitry 120 includes at least one first gating unit.

To be specific, a first input end, a second input end and an output end of the first trigger may server as the first input end, the second input end and the output end of the first triggering sub-circuitry 110 respectively.

The output end of each first trigger may be electrically connected to a first input end of one first gating unit, a second input end of each first gating unit may serve as the second input end of the fixed-point circuitry, third input ends of the first gating units may be electrically connected to each other and grounded, and the output end of each first trigger is configured to output data acquired after the fixed-point processing.

In some possible embodiments of the present disclosure, the first gating sub-circuitry 120 is further configured to: determine whether a difference between a design fixed-point range of a current-level neural network block 200 and a design fixed-point range of a previous-level neural network block 200 is greater than a predetermined threshold; and when the difference is not greater than the predetermined threshold, take the design fixed-point range of the previous-level neural network block 200 as the design fixed-point range of the current-level neural network block 200.

In some possible embodiments of the present disclosure, a function of the first gating sub-circuitry 120 may be achieved directly through the first gating unit. Alternatively, the first gating sub-circuitry 120 may include a control circuitry electrically connected to the first gating unit, and the fixed-point processing performed by the first gating unit maybe controlled by the controller circuitry. The control circuitry is configured to receive the convolutional layer indication signal, determine the corresponding neural network block 200, determine the design fixed-point range of the corresponding neural network block 200 in accordance with the pre-stored design fixed-point range of each neural network block 200, and output the design fixed-point range of the corresponding neural network block 200 to the first gating unit, so that the first gating unit performs the fixed-point processing in accordance with the design fixed-point range.

In some embodiments of the present disclosure, as shown in FIGS. 2 and 3, the fixed-point circuitry 100 further includes a second triggering sub-circuitry 130, a first input end of which is electrically connected to an output end of the first gating sub-circuitry 120, a second input end of which is electrically connected to the second input end of the first triggering sub-circuitry 110, and an output end of which is configured to output the fixed-point data.

In some possible embodiments of the present disclosure, as shown in FIGS. 2 and 3, the second triggering sub-circuitry 130 includes at least one second trigger. A first input end of each second trigger may be electrically connected to an output end of one first gating unit, a second input end of each second trigger may be electrically connected to the second input end of the first trigger, and an output end of each second trigger is configured to output the fixed-point data.

In some possible embodiments of the present disclosure, each trigger may be used for an input cache.

In some possible embodiments of the present disclosure, as shown in FIG. 3, the first triggering sub-circuitry 110 includes a trigger RTL_REG as the first trigger. The first gating sub-circuitry 120 includes four gating units RTL_MUX (corresponding to r_fm1_dout_temp_i, r_fm2_dout_temp_i, r_fm3_dout_temp_i and r_fm4_dout_temp_i respectively) as four first gating units. The second triggering sub-circuitry 130 includes four triggers RTL_REG as second triggers.

The four first gating units may be equivalent to four channels for receiving the feature signals carrying different data information.

The first clock signal inputted to the second input end of the first trigger may be a main operating clock i_clk_100m of a system at a frequency of 100 MHz, a convolutional layer indication signal at a bit width of 6 bits, i.e., i_conv_layer_num, may be inputted to the first input end of the first trigger, and i_fm1_dout_temp, i_fm2_dout_temp, i_fm3_dout_temp and i_fm4_dout_temp of the four first gating units represent the feature signals corresponding to the input feature maps of the convolutional layer. The quantity of input channels may be 4, and a bit width of each channel may be 38 bits.

In some possible embodiments of the present disclosure, as shown in FIG. 3, the feature signals inputted to the input ends of the four first gating units may be i_fm1_dout_temp[37:0], i_fm2_dout_temp[37:0], i_fm3_dout_temp[37:0] and i_fm4_dout_temp[37:0]. A second input end of a first one of the first gating units may include nine second secondary input ends for receiving the feature signal i_fm1_dout_temp[37:0]. A second input end of each of a second one to a fourth one of the first gating units may include eight second secondary input ends for receiving the feature signals i_fm2_dout_temp[37:0], i_fm3_dout_temp[37:0] and i_fm4_dout_temp[37:0]. The first one of the first gating units may include one third input end, and each of the second one to the fourth one of the first gating units may include two third input ends. The fixed-point data outputted by the four second triggers may be r_fm1_dout_temp, r_fm2_dout_temp, r_fm3_dout_temp and r_fm4_dout_temp, each with a bit width of 21 bits.

In some possible embodiments of the present disclosure, based on the fixed-point circuitry in FIG. 3, the convolutional layer indication signal i_conv_layer_num may be inputted to an input cache of the first trigger, and then applied to the four first gating units. The four first gating units may select the fixed-point range in accordance with the current-level neural network block 200, and output processed data. Output caches of the four second trigger may take charge of caching and outputting the fixed-point data, for a next-level neural network block.

For example, when the convolutional layer indication signal indicates 3, a third neural network block 200 may be determined. At this time, the fixed-point processing may be performed in accordance with a design fixed-point range of the third neural network block 200. For example, the feature signals corresponding to the input feature map, i.e., i_fm1_dout_temp, i_fm2_dout_temp, i_fm3_dout_temp and i_fm4_dout_temp, may be shifted to the right by 10 bits, i.e., each feature signal may be multiplied by $2^{10}$, so as to amplify the accuracy, thereby to acquire the fixed-point data within the design accuracy range.

For another example, when the convolutional layer indication signal indicates 3, a seventh neural network block 200 may be determined. At this time, the fixed-point processing may be performed in accordance with a design fixed-point range of the seventh neural network block 200. For example, the feature signals corresponding to the input feature map, i.e., i_fm1_dout_temp, i_fm2_dout_temp, i_fm3_dout_temp and i_fm4_dout_temp, may be shifted to the right by 12 bits, i.e., each feature signal may be multiplied by $2^{12}$, so as to amplify the accuracy, thereby to acquire the fixed-point data within the design accuracy range.

Figure 4:
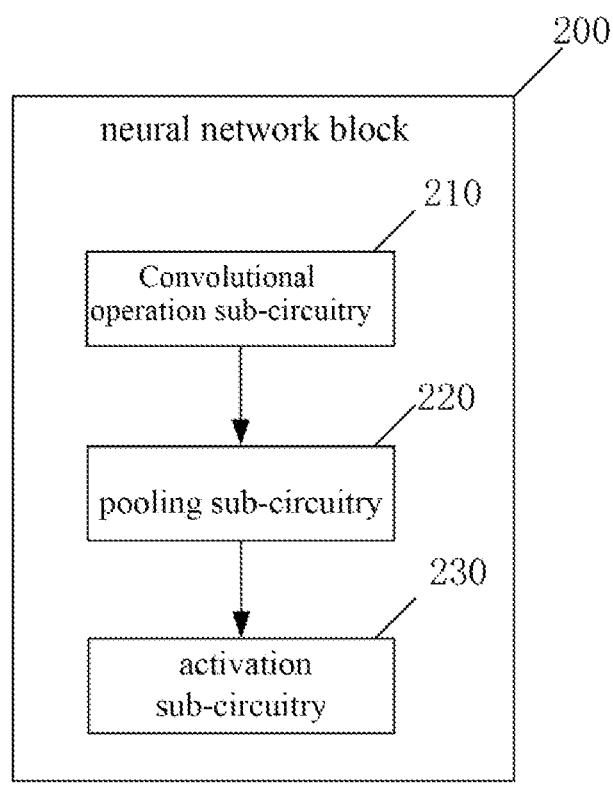
FIG. 4 is a block diagram of a neural network block according to one embodiment of the present disclosure.

In some embodiments of the present disclosure, as shown in FIG. 4, each neural network block 200 includes a convolutional operation sub-circuitry 210, a pooling sub-circuitry 220 and an activation sub-circuitry 230 electrically connected in turn.

The convolutional operation sub-circuitry 210 is electrically connected to the fixed-point circuitry 100, and configured to receive an input feature map corresponding to the fixed-point data from the fixed-point circuitry 100, and perform convolutional processing on the input feature map to acquire a first to-be-processed image. The pooling sub-circuitry 220 is configured to perform pooling processing on the first to-be-processed image to acquire a second to-be-processed image. The activation sub-circuitry 230 is configured to perform activation processing on the second to-be-processed image to acquire the output feature map.

It is found through researches that, the fixed-point processing may be performed on the input/output feature map at each computation layer, and a deeper and larger model needs to be provided for a deep learning algorithm so as to achieve higher accuracy. Hence, there exist such problems as a large quantity of parameters, a large occupancy rate of a storage space and computation complexity for the model. For an embedded device, it is impossible to meet the requirements on the large-scale computation for the deep leaning through its hardware configuration.

Model compression refers to a technology of reconstructing, simplifying and accelerating a deep network for the deep learning. After a network has been trained, there exists a large volume of redundancy for weight parameters. Parameters of the redundancy are unimportant and removable, and the accuracy of the network may not be adversely affected when these parameters are deleted. In addition, when the parameters are reduced, it is able to simplify the network model and increase a computation speed, thereby to improve the overall performance.

For a relationship between a convolutional and a pooling layer in a conventional deep learning neural network model, after the feature map has been inputted to the convolutional layer, the convolutional operation sub-circuitry 210 may extract a feature parameter, an activation function may be inputted to the pooling layer after non-linear mapping, and the feature map may be outputted through a max pooling algorithm. This procedure may lead to a large occupancy rate of the storage space.

In the embodiments of the present disclosure, the activation sub-circuitry 230 may be separated from the convolutional layer and located at the output end of the pooling sub-circuitry 220, so as to reduce the occupancy rate of the storage space and the computation burden of the activation function while ensuring same computation accuracy as a conventional frame, thereby to reduce the storage space and improve the computation speed.

In some possible embodiments of the present disclosure, a max pooling algorithm may be adopted by the pooling sub-circuitry 220, so it is unnecessary for the pooling sub-circuitry 220 to perform the fixed-point processing.

Figure 5:
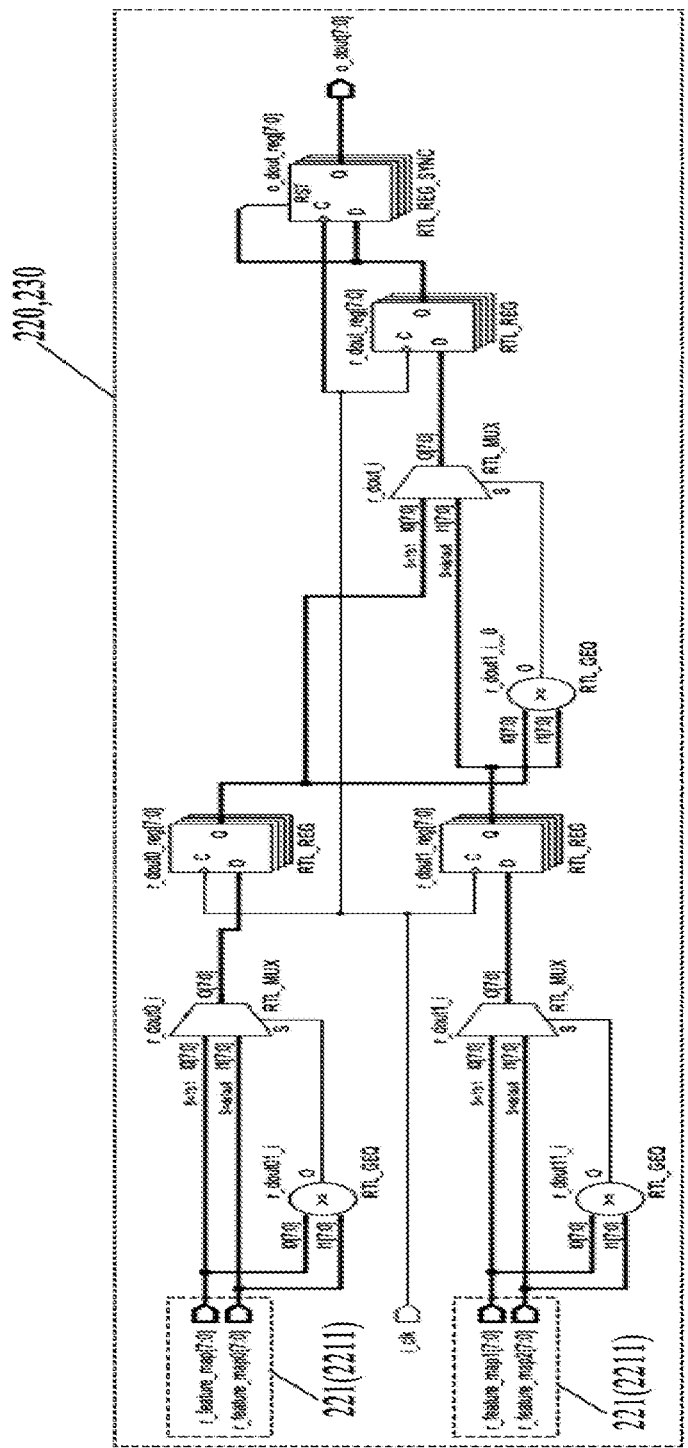
FIG. 5 is a schematic view showing a situation where a pooling sub-circuitry is electrically connected to an activation sub-circuitry according to one embodiment of the present disclosure.

In some embodiments of the present disclosure, as shown in FIGS. 4 and 5, the pooling sub-circuitry 220 includes a plurality of levels of comparison sub-circuitries 221 cascaded sequentially.

The quantity of secondary comparison sub-circuitries 2211 of a current-level comparison sub-circuitry 221 is a designed multiple of the quantity of secondary comparison sub-circuitries 2211 of a next-level comparison sub-circuitry 221. An input end of each secondary comparison sub-circuitry 2211 of a first-level comparison sub-circuitry 221 is configured to receive the first to-be-processed image. Apart from the first-level comparison sub-circuitry, an input end of each secondary comparison sub-circuitry 2211 of a current-level comparison sub-circuitry 221 is electrically connected to an output end of a secondary comparison sub-circuitry 2211 of a previous-level comparison sub-circuitry 221. The plurality of levels of comparison sub-circuitries 221 is configured to compare feature matrices in the received first to-be-processed image sequentially, and select a maximum value to acquire the second to-be-processed image. An output end of a last-level comparison sub-circuitry 221 is electrically connected to an input end of the activation sub-circuitry 230.

In some embodiments of the present disclosure, as shown in FIGS. 4 and 5, each secondary comparison sub-circuitry 2211 includes a comparator, a second gating unit and a third trigger. An input end of the comparator and a first input end of the second gating unit together serve as an input end of the secondary comparison sub-circuitry 2211, a second input end of the second gating unit is electrically connected to an output end of the comparator and configured to receive a comparison result from the comparator, an output end of the second gating unit is electrically connected to a first input end of a corresponding third trigger, a second input end of the third trigger is configured to receive a second clock signal, and an output end of the third trigger serves as an output end of the secondary comparison sub-circuitry 2211. An output end of the third trigger of the last-level secondary comparison sub-circuitry serves as an output end of the last-level comparison sub-circuitry.

In some possible embodiments of the present disclosure, in model testing, the pooling sub-circuitry 220 mainly functions as to reduce the parameters, the dimensions and the computation burden. A convolution kernel with a size of 2*2 and a step of 2 may be selected, so as to acquire feature matrices in each first to-be-processed image. One maximum value may be selected in pixel values in the feature matrices, i.e., one maximum value may be selected in four (2*2) pixel values, and four pixels may be compressed to one pixel. In this way, it is able to reduce the storage occupancy rate of the activation sub-circuitry 230 down to ¼ and reduce the computation burden for the activation function down to ¼ while ensuring the same computation accuracy as the conventional frame, thereby to reduce the storage space and increase the computation speed.

In some embodiments of the present disclosure, as shown in FIGS. 4 and 5, the activation sub-circuitry 230 includes a fourth trigger. A first input end and a resetting end of the fourth trigger are electrically connected to an output end of the last-level comparison sub-circuitry 221, and configured to perform activation processing on each numerical values of the second to-be-processed image to acquire the output feature map. A second input end of the fourth trigger is configured to receive the second clock signal, and an output end of the fourth trigger is configured to output the output feature map.

For example, as shown in FIG. 5, the pooling sub-circuitry 220 includes two levels of comparison sub-circuitries 221 cascaded to each other. The quantity of secondary comparison sub-circuitries 2211 of a first-level comparison sub-circuitry 221 is two times the quantity of secondary comparison sub-circuitries 2211 of a second-level comparison sub-circuitry 221. The pooling sub-circuitry 220 and the activation sub-circuitry 230 totally include three comparators RTL_GEQ, three second gating units RTL_MUX, three third triggers and one first trigger RTL_REG (e.g., D-trigger).

To be specific, an input of each comparator may include two secondary input ends, a first input end of the second gating unit may include two secondary input ends, and r_feature_map, r_feature_map0, r_feature_map1 and r_feature_map2 each with a bit width of 8 bits may be inputted to the secondary input ends of the two comparators of the first-level secondary comparison sub-circuitry 2211 respectively. After comparison processing through the two levels of comparison sub-circuitries 221, the fourth trigger of the activation sub-circuitry 230 may perform activation processing, and output a result o_dout with a bit width of 8 bits.

To be specific, in the first-level comparison sub-circuitry 221, a comparator r_dout01_i may compare r_feature_map with r_feature_map0, the second gating unit r_dout0_i may output a maximum one of the two, and the third trigger may store and output a result r_dout0_reg of the maximum value. Identically, a comparator r_dout11_i may compare r_feature_map1 with r_feature_map2, the second gating unit r_dout1_i may output a maximum one of the two, and the third trigger may store and output a result r_dout1_reg of the maximum value. In the second-level comparison sub-circuitry 221, a comparator r_dout1_i_0 may compare the maximum values, the second gating unit r_dout_i may output a maximum value, i.e., a result acquired after the pooling, and the third trigger may store and output r_dout_reg.

In some possible embodiments of the present disclosure, the fourth trigger may achieve a function of the activation function, i.e., perform the activation processing, and it may be a D-trigger. The fourth trigger may determine whether current data is a positive number or a negative number in accordance with r_dout_reg[7], and r_dout_reg[7] may be connected to a resetting end (RST pin) of the fourth trigger. When r_dout_reg[7]=1, it means that the current data is a negative number, and o_dout may be 0; and when r_dout_reg[7]=0, it means that the current data is a positive number, and o_dout may be o_dout_reg.

Based on the above, i represents a simulation time indicator value, the second clock signal may be a system operating clock i_clk, the inputs may be r_feature_map, r_feature_map0, r_feature_map1 and r_feature_map2, and the output may be o_dout. For example, when i=129, the convolutional operation sub-circuitry 210 may output hexadecimal numbers 0x7a, 0x7b, 0x7c and 0x7d, which are all positive numbers, and o_dout may be 0x7d. When i=132, the convolutional operation sub-circuitry 210 may output negative numbers, and o_dout may be 0.

Figure 6:
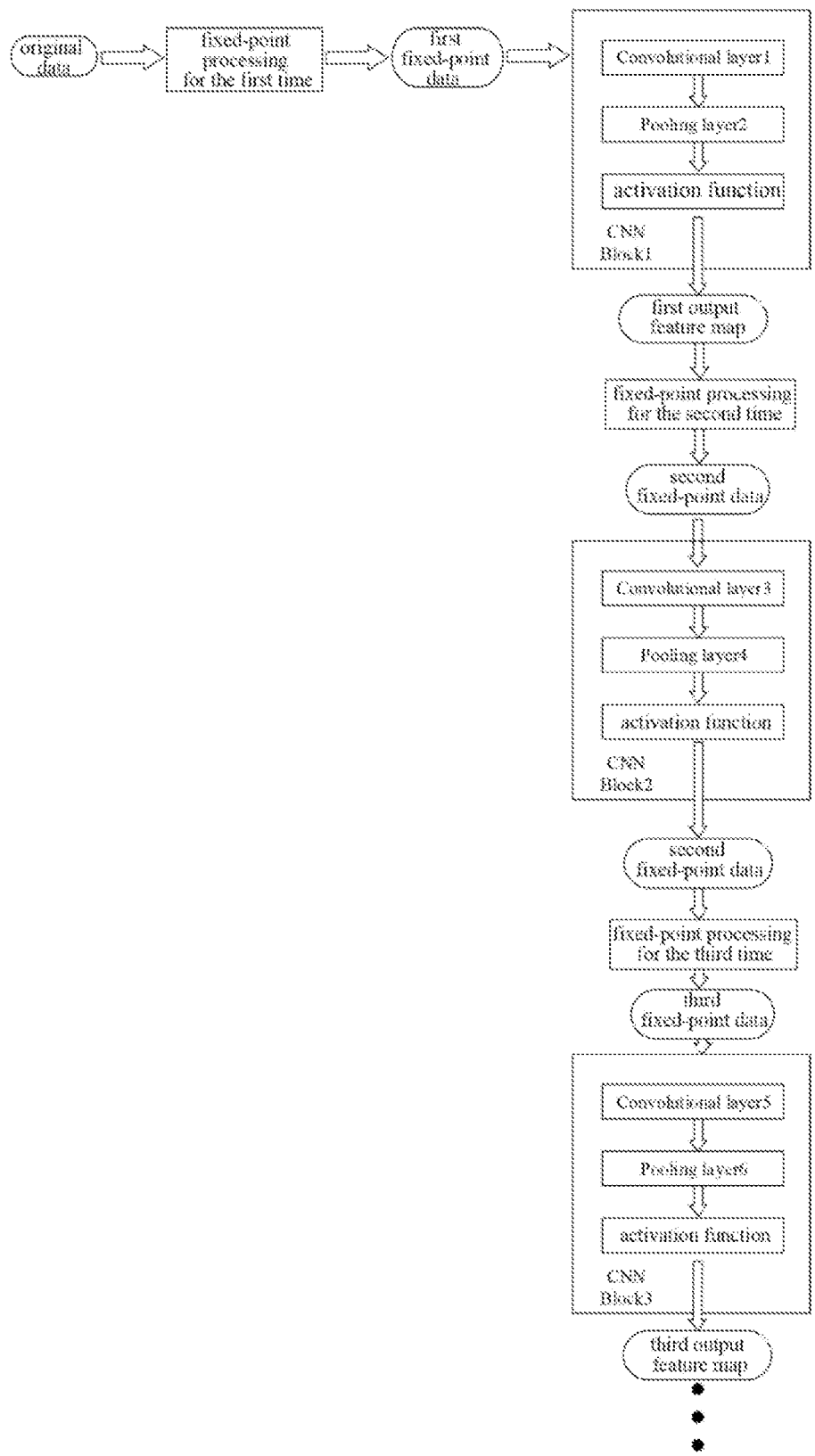
FIG. 6 is a flow chart of an image processing method according to one embodiment of the present disclosure.

Based on the above, FIG. 6 shows a procedure of an image processing method for a display device, which includes the following steps.

Step 1: The fixed-point circuitry 100 may perform fixed-point processing for the first time on original data in accordance with a design fixed-point range of a first neural network block 200 (CNN block1) to acquire first fixed-point data.

Step 2: the first fixed-point data in Step 1 may be inputted, as an input feature map, to the first neural network block 200. The input feature map may be processed by the first neural network module 200 through the convolutional operation sub-circuitry 210 (corresponding to a convolutional layer1), the pooling sub-circuitry 220 (corresponding to a pooling layer2) and the activation sub-circuitry 230 (corresponding to the activation function) sequentially to acquire a first output feature map, and then a feature signal corresponding to the first output feature map may be inputted to the fixed-point circuitry 100 again.

Step 3: the fixed-pointed circuitry 100 may perform fixed-point processing for the second time on the feature signal in Step 2 in accordance with a design fixed-point range of a second neural network block 200 (a CNN block2) to acquire second fixed-point data.

Step 4: the second fixed-point data in Step 3 may be inputted, as an input feature map, to the second neural network block 200. The input feature map may be processed by the second neural network module 200 through the convolutional operation sub-circuitry 210 (corresponding to a convolutional layer3), the pooling sub-circuitry 220 (corresponding to a pooling layer4) and the activation sub-circuitry 230 (corresponding to the activation function) sequentially to acquire a second output feature map, and then a feature signal corresponding to the second output feature map may be inputted to the fixed-point circuitry 100 continuously.

Step 5: the fixed-pointed circuitry 100 may perform fixed-point processing for the third time on the feature signal in Step 4 in accordance with a design fixed-point range of a third neural network block 200 (a CNN block3) to acquire third fixed-point data.

Step 6: the third fixed-point data in Step 5 may be inputted, as an input feature map, to the third neural network block 200. The input feature map may be processed by the third neural network module 200 through the convolutional operation sub-circuitry 210 (corresponding to a convolutional layer5), the pooling sub-circuitry 220 (corresponding to a pooling layer6) and the activation sub-circuitry 230 (corresponding to the activation function) sequentially to acquire a third output feature map, and then a feature signal corresponding to the third output feature map may be inputted to the fixed-point circuitry 100 continuously.

The above procedure will be performed continuously until the output feature map is outputted by a last neural network block 200.

Figure 7:
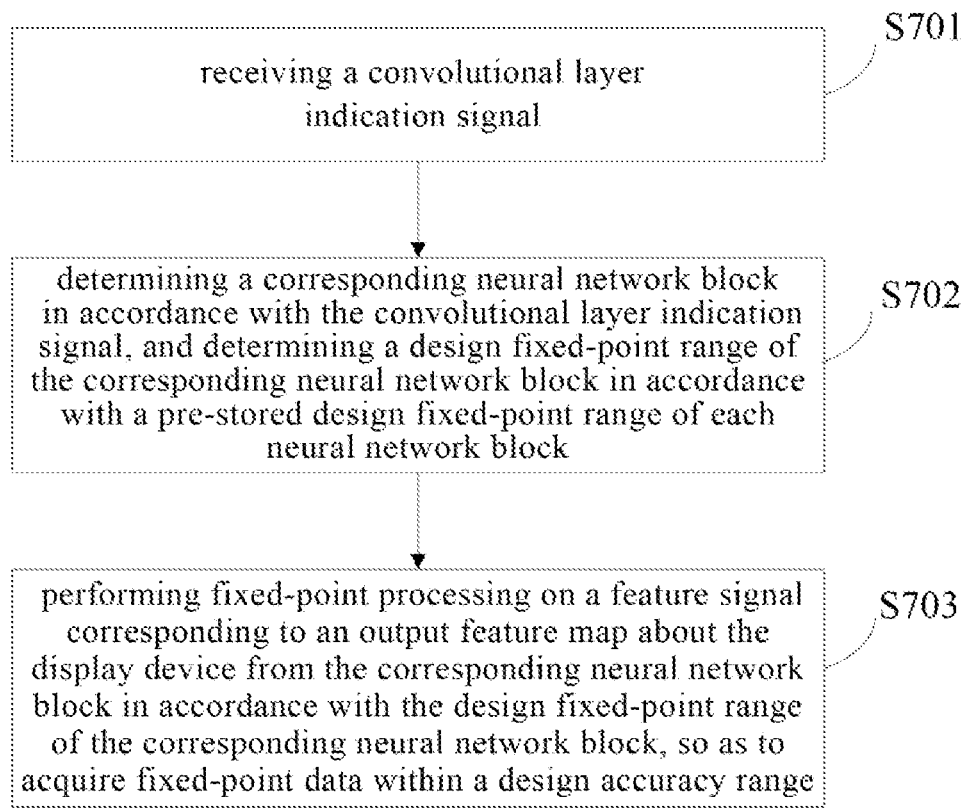
FIG. 7 is another flow chart of the image processing method according to one embodiment of the present disclosure.

Based on a same inventive concept, the present disclosure further provides in some embodiments an image processing method which, as shown in FIG. 7, includes the following Steps S701 to S703.

S701: receiving a convolutional layer indication signal.

In some possible embodiments of the present disclosure, the first gating sub-circuitry 120 may receive the convolutional layer indication signal.

S702: determining a corresponding neural network block 200 in accordance with the convolutional layer indication signal, and determining a design fixed-point range of the corresponding neural network block 200 in accordance with a pre-stored design fixed-point range of each neural network block 200.

In some possible embodiments of the present disclosure, the first gating sub-circuitry 120 may determine the corresponding neural network block 200 in accordance with the convolutional layer indication signal, and determine the design fixed-point range of the corresponding neural network block 200 in accordance with the pre-stored design fixed-point range of each neural network block 200.

S703: performing fixed-point processing on a feature signal corresponding to an output feature map about the display device from the corresponding neural network block 200 in accordance with the design fixed-point range of the corresponding neural network block 200, so as to acquire fixed-point data within a design accuracy range.

In some possible embodiments of the present disclosure, the first gating sub-circuitry 120 may perform the fixed-point processing on the feature signal in accordance with the design fixed-point range of the corresponding neural network block 200, to acquire the fixed-point data within the design accuracy range.

In some embodiments of the present disclosure, in Step S703, the performing fixed-point processing on the feature signal in accordance with the design fixed-point range of the corresponding neural network block 200 so as to acquire the fixed-point data within the design accuracy range may include: determining whether a difference between a design fixed-point range of a current-level neural network block 200 and a design fixed-point range of a previous-level neural network block 200 is greater than a predetermined threshold; and when the difference is not greater than the predetermined threshold, taking the design fixed-point range of the previous-level neural network block 200 as the design fixed-point range of the current-level neural network block 200.

In some possible embodiments of the present disclosure, for example, there may exist nine neural network blocks 200. Based on pre-stored design fixed-point ranges of the neural network blocks 200, when a difference among design fixed-point ranges of second, third and fourth neural network blocks 200 is not greater than the predetermined threshold, the design fixed-point ranges of the three neural network blocks 200 may be similar to each other, and a same fixed-pointed range may be used to perform the fixed-point processing. When a difference between design fixed-point ranges of seventh and eighth neural network blocks 200 is not greater than the predetermined threshold, the design fixed-point ranges of the two neural network blocks 200 may be similar to each other, and a same fixed-pointed range may be used to perform the fixed-point processing. When fixed-point ranges of the other neural network blocks 200 are not similar to each other, the fixed-point processing may be performed separately.

Based on a same inventive concept, the present disclosure further provides in some embodiments a non-transitory computer-readable storage medium storing therein a computer instruction. The computer instruction is executed by a computer so as to implement the above-mentioned image processing method.

The computer-readable medium may include, but not limited to, any disk (e.g., floppy disk, hard disk, optical disk, Compact Disk-Read Only Memory (CD-ROM) or magneto optical disk), ROM, Random Access Memory (RAM), Erasable Programmable Read-Only Memory (EPROM) or Electrically Erasable Programmable Read-Only Memory (EEPROM), flash memory, magnetic card or optical memory card. In other words, the readable medium may include any medium where information is stored or transmitted in a device-readable (e.g., computer-readable) form.

The non-transitory computer-readable storage medium in the embodiments of the present disclosure may be applied to the above-mentioned image processing method, which will not be particularly defined herein.

In addition, the present disclosure further provides in some embodiments a display device including the above-mentioned image processing controller (e.g., a Central Processing Unit (CPU)). The above-mentioned image processing method may be implemented through calling a computer program stored in a non-transitory computer-readable storage medium in the display device.

Here, the display device may be any product or member having a display function, e.g., mobile phone, tablet computer, television, display, laptop computer, digital photo frame or navigator.

It should be appreciated that, steps, measures and schemes in various operations, methods and processes that have already been discussed in the embodiments of the present disclosure may be replaced, modified, combined or deleted. In some possible embodiments of the present disclosure, the other steps, measures and schemes in various operations, methods and processes that have already been discussed in the embodiments of the present disclosure may also be replaced, modified, rearranged, decomposed, combined or deleted. In another possible embodiment of the present disclosure, steps, measures and schemes in various operations, methods and processes that are known in the related art and have already been discussed in the embodiments of the present disclosure may also be replaced, modified, rearranged, decomposed, combined or deleted.

In addition, such words as "first" and "second" may merely be adopted to differentiate different features rather than to implicitly or explicitly indicate any number or importance, i.e., they may be adopted to implicitly or explicitly indicate that there is at least one said feature. Further, such a phrase as "a plurality of" may be adopted to indicate that there are two or more features, unless otherwise specified.

It should be further appreciated that, although with arrows, the steps in the flow charts may not be necessarily performed in an order indicated by the arrows. Unless otherwise defined, the order of the steps may not be strictly defined, i.e., the steps may also be performed in another order. In addition, each of at least parts of the steps in the flow charts may include a plurality of sub-steps or stages, and these sub-steps or stages may not be necessarily performed at the same time, i.e., they may also be performed at different times. Furthermore, these sub-steps or stages may not be necessarily performed sequentially, and instead, they may be performed alternately with the other steps or at least parts of sub-steps or stages of the other steps.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image processing controller for a display device, comprising a fixed-point circuitry and a plurality of neural network blocks cascaded sequentially, wherein the fixed-point circuitry is electrically connected to each neural network block, and configured to receive a feature signal corresponding to an output feature map about the display device from each neural network block, perform fixed-point processing on the feature signal to acquire fixed-point data within a design accuracy range, and input the fixed-point data as an input feature map to a next-level neural network block;

wherein a first input end and a second input end of the fixed-point circuitry are configured to receive a convolutional layer indication signal and the feature signal respectively; and the fixed-point circuitry is configured to determine a corresponding neural network block in accordance with the convolutional layer indication signal, determine a design fixed-point range of the corresponding neural network block in accordance with a design fixed-point range of each neural network block, and perform the fixed-point processing on the feature signal in accordance with the design fixed-point range of the corresponding neural network block, so as to acquire the fixed-point data within the design accuracy range.

2. The image processing controller according to claim 1, wherein the fixed-point circuitry comprises a first triggering sub-circuitry and a first gating sub-circuitry;

a first input end of the first triggering sub-circuitry serves as the first input end of the fixed-point circuitry, a second input end of the first triggering sub-circuitry is configured to receive a first clock signal, a first input end of the first gating sub-circuitry is electrically connected to an output end of the first triggering sub-circuitry, a second input end of the first gating sub-circuitry serves as the second input end of the fixed-point circuitry, and a third input end of the first gating sub-circuitry is grounded; and the first gating sub-circuitry is configured to determine the corresponding neural network block in accordance with the received convolutional layer indication signal, determine the design fixed-point range of the corresponding neural network block in accordance with a pre-stored design fixed-point range of each neural network block, and perform the fixed-point processing on the feature signal in accordance with the design fixed-point range of the corresponding the neural network block, so as to acquire the fixed-point data within the design accuracy range.

3. The image processing controller according to claim 2, wherein the fixed-point circuitry further comprises a second triggering sub-circuitry, a first input end of which is electrically connected to an output end of the first gating sub-circuitry, a second input end of which is electrically connected to the second input end of the first triggering sub-circuitry, and an output end of which is configured to output the fixed-point data.

4. The image processing controller according to claim 3, wherein the activation sub-circuitry comprises a fourth trigger;
a first input end and a resetting end of the fourth trigger are electrically connected to an output end of the last-level comparison sub-circuitry, and configured to perform activation processing on each numerical values of the second to-be-processed image to acquire the output feature map; and
a second input end of the fourth trigger is configured to receive the second clock signal, and an output end of the fourth trigger is configured to output the output feature map.

5. The image processing controller according to claim 1, wherein each neural network block comprises a convolutional operation sub-circuitry, a pooling sub-circuitry and an activation sub-circuitry electrically connected in turn;
the convolutional operation sub-circuitry is electrically connected to the fixed-point circuitry, and configured to receive an input feature map corresponding to the fixed-point data from the fixed-point circuitry, and perform convolutional processing on the input feature map to acquire a first to-be-processed image;
the pooling sub-circuitry is configured to perform pooling processing on the first to-be-processed image to acquire a second to-be-processed image; and
the activation sub-circuitry is configured to perform activation processing on the second to-be-processed image to acquire the output feature map.

6. The image processing controller according to claim 5, wherein the pooling sub-circuitry comprises a plurality of levels of comparison sub-circuitries cascaded sequentially;
the quantity of secondary comparison sub-circuitries of a current-level comparison sub-circuitry is a designed multiple of the quantity of secondary comparison sub-circuitries of a next-level comparison sub-circuitry;
an input end of each secondary comparison sub-circuitry of a first-level comparison sub-circuitry is configured to receive the first to-be-processed image;
apart from the first-level comparison sub-circuitry, an input end of each secondary comparison sub-circuitry of a current-level comparison sub-circuitry is electrically connected to an output end of a secondary comparison sub-circuitry of a previous-level comparison sub-circuitry;
the plurality of levels of comparison sub-circuitries is configured to compare feature matrices in the received first to-be-processed image sequentially, and select a maximum value to acquire the second to-be-processed image; and
an output end of a last-level comparison sub-circuitry is electrically connected to an input end of the activation sub-circuitry.

7. The image processing controller according to claim 6, wherein each secondary comparison sub-circuitry comprises a comparator, a second gating unit and a third trigger; and
an input end of the comparator and a first input end of the second gating unit together serve as an input end of the secondary comparison sub-circuitry, a second input end of the second gating unit is electrically connected to an output end of the comparator and configured to receive a comparison result from the comparator, an output end of the second gating unit is electrically connected to a first input end of a corresponding third trigger, a second input end of the third trigger is configured to receive a second clock signal, and an output end of the third trigger serves as an output end of the secondary comparison sub-circuitry.

8. A display device, comprising an image processing controller, wherein the image processing controller comprises a fixed-point circuitry and a plurality of neural network blocks cascaded sequentially; and
the fixed-point circuitry is electrically connected to each neural network block, and configured to receive a feature signal corresponding to an output feature map about the display device from each neural network block, perform fixed-point processing on the feature signal to acquire fixed-point data within a design accuracy range, and input the fixed-point data as an input feature map to a next-level neural network block;
wherein a first input end and a second input end of the fixed-point circuitry are configured to receive a convolutional layer indication signal and the feature signal respectively; and
the fixed-point circuitry is configured to determine a corresponding neural network block in accordance with the convolutional layer indication signal, determine a design fixed-point range of the corresponding neural network block in accordance with a design fixed-point range of each neural network block, and perform the fixed-point processing on the feature signal in accordance with the design fixed-point range of the corresponding neural network block, so as to acquire the fixed-point data within the design accuracy range.

9. The display device according to claim 8, wherein the fixed-point circuitry comprises a first triggering sub-circuitry and a first gating sub-circuitry;
a first input end of the first triggering sub-circuitry serves as the first input end of the fixed-point circuitry, a second input end of the first triggering sub-circuitry is configured to receive a first clock signal, a first input end of the first gating sub-circuitry is electrically connected to an output end of the first triggering sub-circuitry, a second input end of the first gating sub-circuitry serves as the second input end of the fixed-point circuitry, and a third input end of the first gating sub-circuitry is grounded; and
the first gating sub-circuitry is configured to determine the corresponding neural network block in accordance with the received convolutional layer indication signal, determine the design fixed-point range of the corresponding neural network block in accordance with a pre-stored design fixed-point range of each neural network block, and perform the fixed-point processing on the feature signal in accordance with the design fixed-point range of the corresponding the neural network block, so as to acquire the fixed-point data within the design accuracy range.

10. The display device according to claim 9, wherein the fixed-point circuitry further comprises a second triggering sub-circuitry, a first input end of which is electrically connected to an output end of the first gating sub-circuitry, a second input end of which is electrically connected to the second input end of the first triggering sub-circuitry, and an output end of which is configured to output the fixed-point data.

11. The display device according to claim 10, wherein the activation sub-circuitry comprises a fourth trigger;
   a first input end and a resetting end of the fourth trigger are electrically connected to an output end of the last-level comparison sub-circuitry, and configured to perform activation processing on each numerical values of the second to-be-processed image to acquire the output feature map; and
   a second input end of the fourth trigger is configured to receive the second clock signal, and an output end of the fourth trigger is configured to output the output feature map.

12. The display device according to claim 8, wherein each neural network block comprises a convolutional operation sub-circuitry, a pooling sub-circuitry and an activation sub-circuitry electrically connected in turn;
   the convolutional operation sub-circuitry is electrically connected to the fixed-point circuitry, and configured to receive an input feature map corresponding to the fixed-point data from the fixed-point circuitry, and perform convolutional processing on the input feature map to acquire a first to-be-processed image;
   the pooling sub-circuitry is configured to perform pooling processing on the first to-be-processed image to acquire a second to-be-processed image; and
   the activation sub-circuitry is configured to perform activation processing on the second to-be-processed image to acquire the output feature map.

13. The display device according to claim 12, wherein the pooling sub-circuitry comprises a plurality of levels of comparison sub-circuitries cascaded sequentially;
   the quantity of secondary comparison sub-circuitries of a current-level comparison sub-circuitry is a designed multiple of the quantity of secondary comparison sub-circuitries of a next-level comparison sub-circuitry;
   an input end of each secondary comparison sub-circuitry of a first-level comparison sub-circuitry is configured to receive the first to-be-processed image;
   apart from the first-level comparison sub-circuitry, an input end of each secondary comparison sub-circuitry of a current-level comparison sub-circuitry is electrically connected to an output end of a secondary comparison sub-circuitry of a previous-level comparison sub-circuitry;
   the plurality of levels of comparison sub-circuitries is configured to compare feature matrices in the received first to-be-processed image sequentially, and select a maximum value to acquire the second to-be-processed image; and
   an output end of a last-level comparison sub-circuitry is electrically connected to an input end of the activation sub-circuitry.

14. The display device according to claim 13, wherein each secondary comparison sub-circuitry comprises a comparator, a second gating unit and a third trigger; and
   an input end of the comparator and a first input end of the second gating unit together serve as an input end of the secondary comparison sub-circuitry, a second input end of the second gating unit is electrically connected to an output end of the comparator and configured to receive a comparison result from the comparator, an output end of the second gating unit is electrically connected to a first input end of a corresponding third trigger, a second input end of the third trigger is configured to receive a second clock signal, and an output end of the third trigger serves as an output end of the secondary comparison sub-circuitry.

* * * * *